Aug. 19, 1958 W. SCHAERER 2,847,764
INSTRUMENT FOR MEASURING GREAT LENGTHS
Filed Sept. 30, 1954
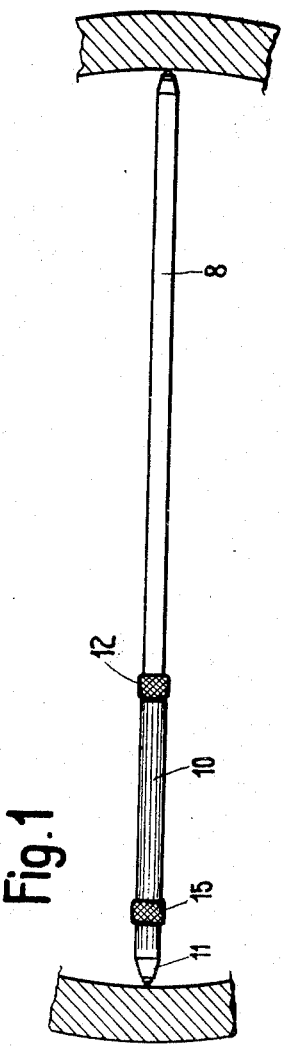
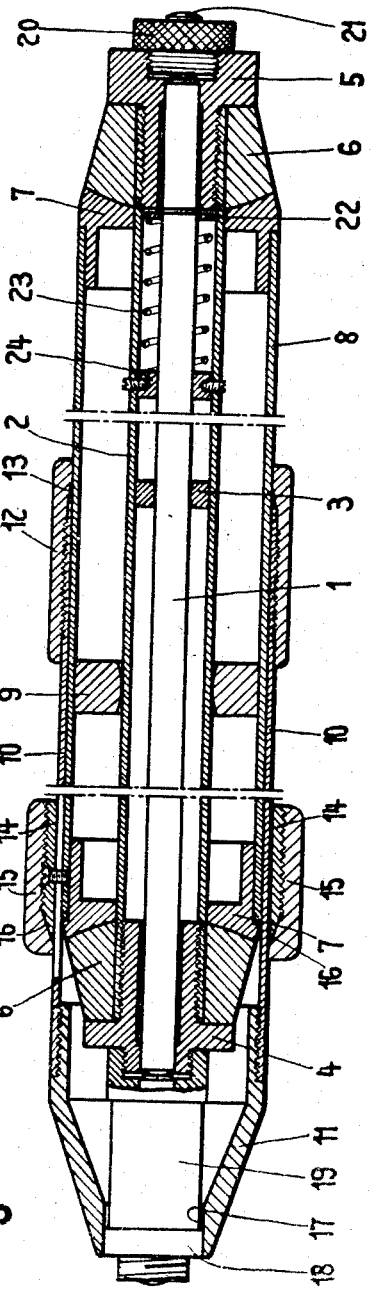
INVENTOR
WILHELM SCHAERER
BY Edward V. Connor,
ATTORNEY United States Patent Office 2,847,764
Patented Aug. 19, 1958

2,847,764
INSTRUMENT FOR MEASURING GREAT LENGTHS

Wilhelm Schaerer, Berne, Switzerland, assignor to W. Schaerer & Co. A. G., Berne, Switzerland Application September 30, 1954, Serial No. 459,460

Claims priority, application Switzerland November 5, 1953

7 Claims. (Cl. 33—168)

This invention relates to an instrument for measuring lengths, particularly great lengths exceeding 1.5 meters (5 feet), and is particularly applicable for testing the diameter and the concentricity of large bores. When it is desired to measure the bore of a work piece being worked on a horizontal turning lathe it is tested in two mutually perpendicular directions, at least one of the measurements being in horizontal direction. The measurement of a bore of a work piece worked on a vertical lathe is effected in horizontal direction.

When measuring great lengths in horizontal direction, a disadvantage occurs in that the measuring instrument has an appreciable sag or bending in its neutral axis due to the effect of its own weight, whereby the measurement is inaccurate. It is the main object of this invention to reduce this sag to an insignificant amount by supporting the measuring element of the measuring instrument in a supporting element under pull. The sag of the supporting element is very small when a considerable tension is applied thereto and the measuring element which is carried by the supporting element preferably at a number of supporting points, will sag as little as the support without being subject itself to any compression or tension.

Other objects and advantages of the invention will be apparent from the following description and from the accompanying drawings which show, by way of example, an embodiment of the invention.

Fig. 1 shows the measuring instrument for great lengths in use for testing the diameter of a large bore.

Fig. 2 is an axial section of the instrument shown in Fig. 1 but on a larger scale.

The measuring element 1 of the measuring instrument, which may be a rod or tube, is carried in a supporting tube 2 by means of carrying rings 3 in such a way that the measuring element 1 may easily be displaced in axial direction within the supporting tube 2 but has little free motion in radial direction. Externally threaded flanged sleeves 4 and 5 respectively are screwed into the ends of the tube 2, serving, on one hand for radial guidance of the measuring rod 1 and on the other hand for ring-shaped pressure transmitting members 6. Pressure transmitting rings 7 having concave spherical faces rest against corresponding convex spherical faces of the members 6. The pressure transmitting rings 7 are fixed to a pressure tube 8. The tube 2 is carried in the pressure tube 8 by means of centering rings 9. The inner carrying rings 3 are preferably equally spaced over the length of the measuring instrument, whereas the outer carrying rings 9 are prefeably spaced by a minimum distance from the middle of the measuring rod, for instance by ¼ of the length of the rod from the ends thereof.

An end piece 20 having a projecting measuring element 21 is inserted into the flange of sleeve 5 of the instrument for measuring lengths.

In order that the measuring element 1 always assumes the same relative axial position within the measuring instrument when the latter is out of use, a disc 22 locked by a spring washer is provided on the measuring element 1, which is thus pressed against the stop constituted by the sleeve 5 by a coil spring 23. The other end of the spring 23 abuts a collar 24 fixed in the tube 2 by means of screws.

A relatively short extension piece or adapter 19 of a determined length is screwed on to a rearward, externally threaded, extension of the sleeve 4. Further similar extension pieces having corresponding male and female threads may be added to the extension piece 19 in a way not shown, and a dial indicator or a simple micrometer-screw of any desired conventional type might be arranged at the measuring end. By this addition of extension pieces, the measuring instrument may be adapted for a given range of measurement, for instance for a range of 10 to 12 feet with a measuring instrument of 10 feet in length.

A supporting sleeve is fixed on the pressure tube 8, for carrying the extension pieces 19. This supporting sleeve has a slit tubular portion 10 screwed to a funnel-shaped supporting piece 11 at the left-hand end as shown. A locking ring 12 conically tapered at 13 is applied to the right hand end of the portion 10 slid onto the pressure tube 8. When the locking ring 12 is fully screwed onto the portion 10, the right hand end of this latter is clamped onto the tube 8. An externally threaded split ring 14 is loosely held on the left hand end of the pressure tube 8 by means of a screw, and the slit portion 10 is passed through this split ring. A locking ring 15 having a conical face 16, is screwed onto the split ring 14. When this locking ring 15 is fully screwed to the right (Fig. 2) the split ring 14 is pressed onto the portion 10 which is thereby clamped onto the tube 8. When the locking rings 12 and 15 are loosened, the portion 10 may be displaced axially into any desired position on the tube 8, that is, into the position for which the supporting face 17 of the supporting piece 11 contacts a face 18 of a terminal extension piece 19. When this position of the supporting piece 11 is reached, the portion 10 may be clamped to the tube 8 in two places by screwing the locking rings 12 and 15 tight, whereby the position of the portion 10 and of the extensions is fixed with respect to the tube 8.

The instrument for measuring great lengths may be assembled as follows:

First the measuring element 1 is inserted into the tube 2 which has been heated and provided with the supporting rings 3, the collar 24, the spring 23 and the disc 22. Thereon the outer parts, that is the pressure tube 8 with the pressure transmitting rings 7 and the pressure transmitting members 6, are slid onto the tube 2, whereafter the sleeves 4 and 5 are inserted and screwed tight so that no axial free play will remain between the tubes 2 and 8 and the parts connecting such tubes. Therefore, when the tube 2 has cooled down, a pull will be set up in the same which is transmitted to the pressure tube 8 by parts 4, 5, 6 and 7. In the finished measuring instrument, the supporting tube 2 will be continuously under pull and will only sag by a very small amount, when the measuring instrument is used for measuring in horizontal direction. Therefore sagging of the measuring element 1 which is supported in the tube 2 by means of the supporting rings 3 is also avoided. In order to avoid turning moments in the structure between tubes 2 and 8, which moments would result in an undesired bending of the tubes, relatively movable spherical contacting faces are provided on parts 6 and 7. Therefore direct tensile and compressive stresses will be applied to the tubes 2 and 8 respectively.

Due to the centering rings 9 inserted between the pressure tube 8 and the supporting tube 2, the buckling resistance of the tube 8 is substantially increased because the centering forces of the supporting tube 2 will oppose buckling of the tube 8. By the supporting points between the tubes 8 and 2, the free buckling length in the pressure tube 8 and the free sagging length in the supporting tube 2 are shortened, whereby the amounts of maximal buckling of tube 8 and the maximal sag of tube 2 are appreciably reduced. It was found for a measuring instrument of 10 feet that the sag of the tube 2 with the measuring rod 1, when supported at both ends without any tensile stress was ten times the sag of the tube 2 under tension and supported in the tube 8.

The supporting sleeve 10, 11 exclusively serves for carrying long rows of assembled extension pieces 19 so that no external forces will act onto such extensions thereby causing excessive sag of the same.

Both tubes 2 and 8 enclosing the measuring element 1 and particularly the hollow space enclosed between such tubes provide for good heat isolation of the measuring element thereby adding to the excellent constance of the length of the measuring instrument.

For measuring lengths, diameters and eccentricities the measuring instrument may be used with or without extension pieces 19, the total length of the measuring element 1 and of the similar measuring elements of the extension pieces being adjusted to be equal to the length to be measured or checked. The so prepared measuring instrument is used in the way of an end-measuring rod, that is, it is inserted between opposite faces between which the distance is to be measured or checked. According to whether the instrument may be introduced between the opposite faces with play or without play the distance to be checked is too large or correct. If the measuring instrument cannot be introduced between opposite faces the distance between such faces is too small and therefore must be worked again. For measuring the diameter of a large bore the measuring instrument is inserted into the bore as illustrated in Fig. 1, the bore being too small, correct or too large according to whether the instrument cannot be introduced into the bore, the instrument can be introduced without play or the instrument can be introduced with play respectively. For determining the eccentricity of a bore, the measuring instrument is inserted in the manner just described into the bore in two mutual perpendicular directions and an eccentricity is present or not according to whether both diameters measured in this manner are different or equal. Generally speaking the measuring instrument described herein may be used exactly in the manner of the well-known end-measuring rods but it is suitable for measuring particularly great lengths with an accuracy that was not possible with the known measuring rods. For measurement of the instrument is supported by hand or in a special supporting structure whereas the measuring element 1 is applied with its ends against the faces between which the distance is to be measured or checked.

When equipped with a micrometer-screw extensiometer at one end the measuring instrument illustrated may be used for extremely accurate measurement of great lengths. For measuring in this way the measuring instrument assembled with the micrometer-screw extensiometer is inserted with play between faces between which the distance is to be measured, whereafter the micrometer-screw extensiometer is adjusted until its measuring rod rightly applies against the one face. The length of the micrometer-screw extensiometer may then be read on a scale as is well known in the art and this length may be added to the constant length of the measuring element 1 in order to obtain the total measured distance between the said faces.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. An instrument for measuring lengths comprising a supporting tube having opposite ends, a pressure tube enclosing the supporting tube and having opposite ends, connecting means, adjacent ends of the said supporting tube and of the said pressure tube being interconnected with each other by the said connecting means, a pull being set up in the said supporting tube by the said connecting means, the said pull being taken up by the said pressure tube, and a measuring element carried in the said supporting tube.

2. An instrument according to claim 1, comprising first pressure transmitting members attached to each end of the said supporting tube and second pressure transmitting members attached to each end of the said pressure element, the said first and second pressure transmitting members having spherical pressure transmitting faces, the pressure transmitting faces of the first and second pressure transmitting members attached to adjacent ends of the said supporting tube and pressure tube respectively engaging each other, and the pull from the ends of the said supporting tube being transmitted to the ends of the said pressure tube over the said spherical faces of the said first and second pressure transmitting members.

3. An instrument according to claim 1, comprising extension pieces, means for attaching such extension pieces to at least one end of the said supporting tube, and a stiff supporting member attachable to the said pressure tube being provided for carrying such extension pieces.

4. An instrument according to claim 3, the said supporting member being axially adjustable on the said pressure tube.

5. An instrument according to claim 4, the said supporting member including a slit tubular portion, clamping means in operative engagement with the slit portion of the said tubular portion for clamping the said slit tubular portion onto the said pressure tube and allowing axial displacement of the slit tubular portion on and removal of the slit tubular portion from the pressure tube when loosened, and supporting means attached to the said slit tubular portion for at least one of the extension pieces.

6. An instrument for measuring lengths, comprising a supporting element, an elongated measuring element of substantially the same length as the supporting element, the said measuring element being supported for displacement in longitudinal direction in the said supporting element, opposite ends on the said supporting element, and means attached to the said ends of the supporting element for setting up pulling stresses in the said supporting element.

7. An instrument for measuring lengths, having a measuring element and a supporting element extending over substantially the whole length of the measuring element, the said measuring element being axially displaceable and laterally supported in the said supporting element, ends on the said supporting element, a pressure element extending over substantially the whole length of the measuring element and having ends attached to the ends of the said supporting element in such a way that pulling stresses are set up in the said supporting element and pressure stresses are set up in the said pressure element.

References Cited in the file of this patent

UNITED STATES PATENTS

| | | |
|---|---|---|
| 695,661 | Thiebault | Mar. 18, 1902 |
| 1,559,801 | Steinle | Nov. 3, 1925 |
| 1,770,933 | Leake | July 22, 1930 |
| 2,312,222 | Tanner | Feb. 23, 1943 |
| 2,371,302 | Lester | Mar. 13, 1945 |
| 2,453,079 | Rossmann | Nov. 2, 1948 |
| 2,496,655 | Balk | Feb. 7, 1950 |